United States Patent
Harada et al.

(10) Patent No.: US 8,712,652 B2
(45) Date of Patent: Apr. 29, 2014

(54) CONTROL DEVICE OF HYBRID VEHICLE

(75) Inventors: Taku Harada, Nisshin (JP); Masatoshi Ito, Okazaki (JP); Kazuyuki Shiiba, Miyoshi (JP); Takeshi Kanayama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/990,351

(22) PCT Filed: Nov. 30, 2010

(86) PCT No.: PCT/JP2010/071350
§ 371 (c)(1),
(2), (4) Date: Jun. 26, 2013

(87) PCT Pub. No.: WO2012/073323
PCT Pub. Date: Jun. 7, 2012

(65) Prior Publication Data
US 2013/0282221 A1 Oct. 24, 2013

(51) Int. Cl.
*G06F 7/00* (2006.01)

(52) U.S. Cl.
USPC .............................. 701/54; 701/22

(58) Field of Classification Search
USPC ........................................ 701/22, 54
See application file for complete search history.

(56) References Cited

U.S. PATENT DOCUMENTS

| | | | |
|---|---|---|---|
| 5,697,940 A | 12/1997 | Chu et al. | |
| 6,208,034 B1 * | 3/2001 | Yamaguchi | 290/40 C |
| 6,543,395 B2 * | 4/2003 | Green | 123/27 GE |
| 6,853,893 B2 * | 2/2005 | Corcione et al. | 701/22 |
| 7,024,871 B2 * | 4/2006 | Zhu et al. | 62/133 |
| 7,222,004 B2 * | 5/2007 | Anderson | 701/22 |
| 7,292,932 B1 * | 11/2007 | Ledger et al. | 701/110 |
| 7,357,204 B2 * | 4/2008 | Hisada et al. | 180/65.285 |
| 8,209,103 B2 * | 6/2012 | Oyama et al. | 701/101 |
| 2003/0173123 A1 * | 9/2003 | Nakanowatari | 180/65.2 |
| 2004/0112652 A1 * | 6/2004 | Esposito Corcione et al. | 180/65.2 |
| 2005/0082097 A1 * | 4/2005 | Ichimoto et al. | 180/65.2 |
| 2007/0089704 A1 * | 4/2007 | Jacobsson et al. | 123/299 |
| 2008/0091309 A1 * | 4/2008 | Walker | 701/1 |
| 2009/0259391 A1 | 10/2009 | Ando et al. | |

FOREIGN PATENT DOCUMENTS

| | | |
|---|---|---|
| JP | A-58-160530 | 9/1983 |
| JP | A-11-93725 | 4/1999 |
| JP | A-11-173171 | 6/1999 |
| JP | A-2000-97098 | 4/2000 |
| JP | A-2005-220748 | 8/2005 |
| JP | A-2007-126097 | 5/2007 |
| JP | A-2008-162397 | 7/2008 |
| JP | A-2008-201351 | 9/2008 |

* cited by examiner

Primary Examiner — Hussein A. Elchanti
(74) Attorney, Agent, or Firm — Oliff PLC

(57) ABSTRACT

Providing a control device of a hybrid vehicle capable of reducing a rattling noise without changing an engine rotation speed. If the second electric motor torque $T_{M2}$ is within the rattling noise occurrence region G, the engine rotation fluctuation suppression control (at least one of the EGR amount suppression control, the self-EGR amount suppression control, the lean-burn control, and the ignition delay control) is provided to suppress the engine rotation fluctuations as compared to during normal running while the second electric motor torque $T_{M2}$ is out of the rattling noise occurrence region G and, therefore, the engine rotation fluctuations can be suppressed to reduce the a rattling noise without changing an engine rotation speed $N_E$. Thus, the rattling noise can be reduced without giving an uncomfortable feeling to a user due to a change in the engine rotation speed $N_E$.

6 Claims, 6 Drawing Sheets

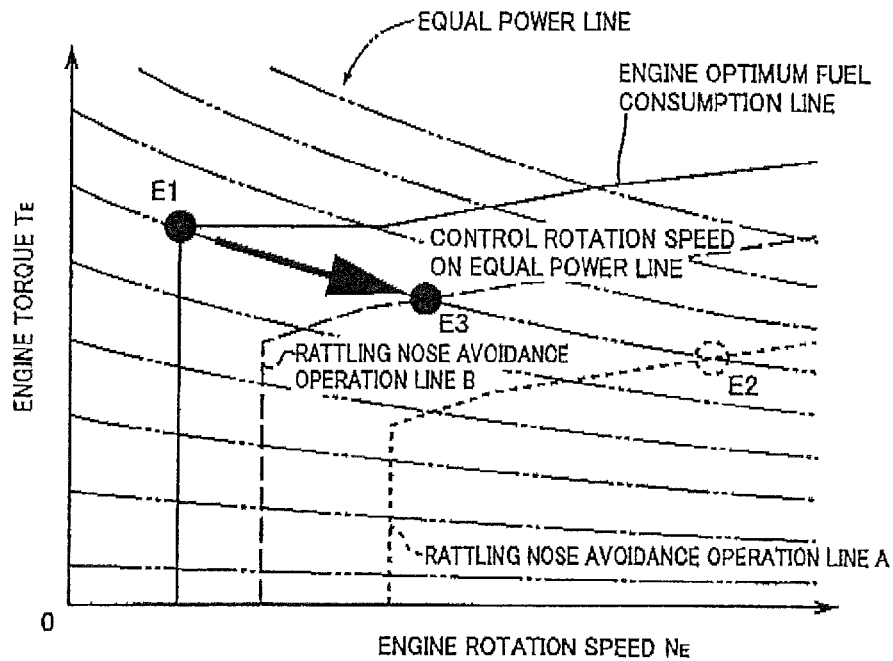
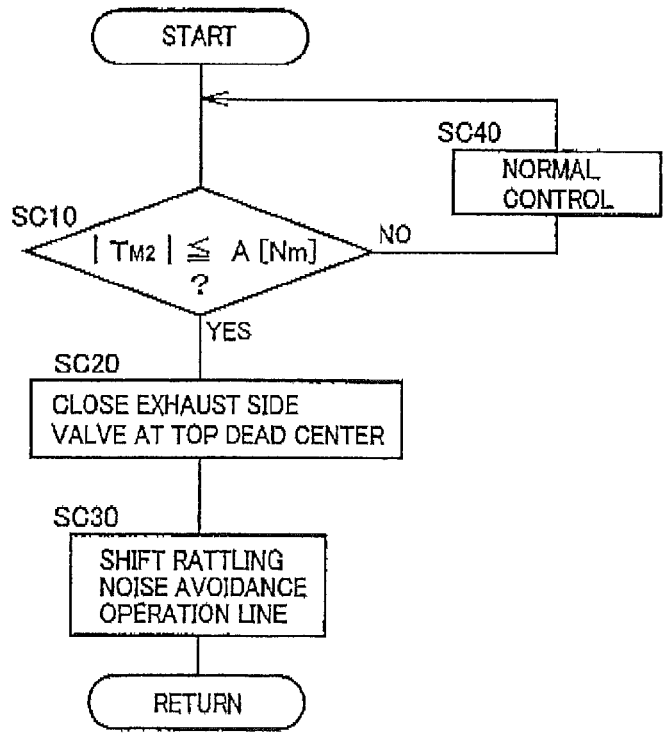

US 8,712,652 B2

CONTROL DEVICE OF HYBRID VEHICLE

TECHNICAL FIELD

The present invention relates to a control device of a hybrid vehicle including a power distribution type electric differential portion and particularly to a technique of reducing gear bearing noise in the electric differential portion due to rotation fluctuations of an engine.

BACKGROUND ART

A hybrid vehicle is well known that includes an electric differential portion having a differential mechanism distributing power from an engine to a differential electric motor and an output rotating member and an electric motor for running coupled in a power transmittable manner (i.e., coupled directly or indirectly via a gear mechanism) to the output rotating member such that a differential state of the differential mechanism is controlled by controlling an operating state of the differential electric motor. For example, this corresponds to a hybrid vehicle described in Patent Document 1.

In the hybrid vehicle as described above, for example, gear bearing noise may occur from a gear mechanism making up the electric differential portion. Specifically, the gear mechanism has a gap in a meshing portion between mutually meshing gears. For example, if the output torque of the electric motor for running is close to substantially zero, including the value zero [Nm] (i.e., if the electric motor for running is in a floating state), a gear floating state occurs in which a mutually pressing force is made weaker between gears of a certain gear pair on which the output torque of the electric motor for running is normally acted. In such a state, the transmission of vibrations due to engine rotation fluctuations (explosion fluctuations) to the meshing portion of the gear pair may cause tooth surfaces of meshing teeth to strike together while repeatedly colliding with and separating from each other in the meshing portion, thereby generating a gear bearing noise, i.e., so-called rattling noise. To reduce such a rattling noise, for example, in Patent Document 1, it is proposed that, if the output torque of the electric motor for running falls within a predetermined range and a condition of occurrence of the rattling noise is detected, an engine rotation speed is increased to a predetermined value or more by equal power while an engine torque is reduced to a predetermined value or less so as to suppress the engine torque fluctuations. Specifically, the engine is normally operated along a predetermined engine operation line (e.g., engine optimum fuel consumption line) allowing the engine to operate as efficiently as possible while the operating state of the engine (e.g., an engine operating point represented by an engine rotation speed and an engine torque) is smoothly changed in response to a necessary change in engine power. On the other hand, if the condition of occurrence of the rattling noise is detected, the engine rotation speed is increased to the predetermined value or more to shift the engine operating point from the engine optimum fuel consumption line to a predetermined engine operating line (e.g., rattling noise avoidance operation line) for avoiding the rattling noise on an equal power line.

PRIOR ART DOCUMENTS

Patent Documents

Patent Document 1: Japanese Laid-Open Patent Publication No. 11-93725
Patent Document 2: Japanese Laid-Open Patent Publication No. 58-160530
Patent Document 3: Japanese Laid-Open Patent Publication No. 11-173171
Patent Document 4: Japanese Laid-Open Patent Publication No. 2007-126097

SUMMARY OF THE INVENTION

Problem to Be Solved by the Invention

Even when the engine optimum fuel consumption line and the rattling noise avoidance operation line are distant from each other to some extent, it is considered that if a certain longer transition time is ensured when the engine operating point on the engine optimum fuel consumption line is shifted to the engine operating point on the rattling noise avoidance operation line on the equal power line, a user may hardly feel uncomfortable since an engine rotation speed gradually increases. On the other hand, this may increase a frequency of occurrence of the rattling noise or may increase the time until the rattling noise is reduced. Therefore, it is desired to make the transition time as short as possible. However, when the transition time is made shorter, or when the engine optimum fuel consumption line and the rattling noise avoidance operation line are more distant from each other, the engine rotation speed more rapidly increases and, therefore, a user may easily feel uncomfortable. In other words, the user may feel uncomfortable about a rapid increase in the engine rotation speed. The problem as described above is not known and no proposal has been made on reducing the rattling noise without giving an uncomfortable feeling to a user about a change in the engine rotation speed.

The present invention was conceived in view of the situations and it is therefore an object of the present invention to provide a control device of a hybrid vehicle capable of reducing a rattling noise without changing an engine rotation speed.

Means for Solving the Problem

To achieve the object, the present invention provides (a) a control device of a hybrid vehicle including an electric differential portion having a differential mechanism distributing power from an engine to a differential electric motor and an output rotating member and an electric motor for running coupled to the output rotating member in a power transmittable manner such that a differential state of the differential mechanism is controlled by controlling an operating state of the differential electric motor, wherein (b) if an output torque of the electric motor for running is within a predetermined range, the control device of a hybrid vehicle provides control for suppressing rotation fluctuations of the engine as compared to the case that the output torque of the electric motor for running is out of the predetermined range, and wherein (c) the control for suppressing rotation fluctuations of the engine includes at least one of a control for suppressing an exhaust gas recirculation amount, a control for suppressing a remaining amount of combustion gas in a cylinder in an exhaust stroke, a control for shifting an air fuel ratio to a lean side, and a control for delaying an ignition timing.

Effects of the Invention

Consequently, if the output torque of the electric motor for running is within the predetermined range, the control for suppressing rotation fluctuations of the engine is provided as compared to the case that the output torque of the electric motor for running is out of the predetermined range and, therefore, the rotation fluctuations of the engine can be suppressed to reduce a rattling noise without changing an engine rotation speed. Thus, the rattling noise can be reduced without giving an uncomfortable feeling to a user due to a change in the engine rotation speed. Specifically, since the control for suppressing rotation fluctuations of the engine includes at least one of the control for suppressing the exhaust gas recirculation amount, the control for suppressing the remaining amount of combustion gas in the cylinder in the exhaust stroke, the control for shifting the air-fuel ratio to the lean side, and the control for delaying the ignition timing, the rotation fluctuations of the engine can properly be suppressed without changing the engine rotation speed (in an extreme case, without changing an engine operating point). For example, the control for suppressing the exhaust gas recirculation amount (an EGR amount) can suppress the explosion variations between cylinders generated because a larger EGR amount causes the fuel density in the cylinders to vary in each cylinder due to variations in a remaining amount of unburned gas contained in exhaust gas and, therefore, the rotation fluctuations of the engine can properly be suppressed without changing the engine operating point. The control for suppressing the remaining amount of combustion gas in the cylinder in the exhaust stroke can suppress the explosion variations between the cylinders generated because a larger remaining amount of the combustion gas causes the fuel density in the cylinders to vary in each cylinder due to variations in the remaining amount of the unburned gas contained in the combustion gas in the cylinder the and, therefore, the rotation fluctuations of the engine can properly be suppressed without changing the engine operating point. The control for shifting the air-fuel ratio to the lean side can reduce only a peak value of an engine torque while an average value of the rotationally fluctuating engine torque is maintained and, therefor; the rotation fluctuations of the engine can properly be suppressed without changing the engine operating point. The control for delaying the ignition timing can reduce only the peak value of the engine torque while the average value of the rotationally fluctuating engine torque is maintained and, therefore, the rotation fluctuations of the engine can properly be suppressed without changing the engine operating point.

Preferably, the predetermined range is a gear bearing noise occurrence region obtained in advance as a range of the output torque of the electric motor for running in which a gear bearing noise easily occurs due to the rotation fluctuations of the engine in gears making up the electric differential portion. Consequently, if the output torque of the electric motor for running is within the gear bearing noise occurrence region, the rotation fluctuations of the engine can properly be suppressed without changing the engine operating point.

Preferably, if the output torque of the electric motor for running is within the predetermined range, control can be provided for shifting an operating point of the engine operated along a predetermined engine optimum fuel consumption line when the output torque of the electric motor for running is out of the predetermined range, onto a gear bearing noise avoidance operation line obtained in advance for avoiding the gear bearing noise due to the rotation fluctuations of the engine in the gears making up the electric differential portion, and if the output torque of the electric motor for running is within the predetermined range, one of the control for suppressing the rotation fluctuations of the engine and the control for shifting the operating point of the engine onto the gear bearing noise avoidance operation line is selected and provided such that fuel consumption deterioration is more suppressed at the time of provision of control. Consequently, as compared to the case of reducing the rattling noise through only the control for suppressing the rotation fluctuations of the engine and the case of reducing the rattling noise through only the control for shifting the operating point of the engine onto the gear bearing noise avoidance operation line, fuel consumption can be improved when the control is provided for reducing the rattling noise.

Preferably, if the output torque of the electric motor for running is within the predetermined range, control can be provided for shifting an operating point of the engine operated along a predetermined engine optimum fuel consumption line when the output torque of the electric motor for running is out of the predetermined range, onto a gear bearing noise avoidance operation line obtained in advance for avoiding the gear bearing noise due to the rotation fluctuations of the engine in the gears making up the electric differential portion, and if the output torque of the elect, is motor for running is within the predetermined range, the control for suppressing the rotation fluctuations of the engine and the control for shifting the operating point of the engine onto the gear bearing noise avoidance operation line is provided in a combined manner. Consequently, the rattling noise can be further reduced, as compared to reducing the rattling noise through only the control for suppressing the rotation fluctuations of the engine. Since the gear bearing noise avoidance operation line can be set on the assumption that the raffling noise is reduced through the control for suppressing the rotation fluctuations of the engine, when the control is provided to shift the engine operating point from the engine optimum fuel consumption line onto the gear bearing noise avoidance operation line, a change in the engine rotation speed can be made smaller as compared to the case of reducing the rattling noise through only the control for shifting the operating point of the engine onto the gear bearing noise avoidance operation line.

BRIEF DESCRIPTION OF DRAWINGS

FIG. 8 is a diagram of an example of a rattling noise avoidance operation line used in a third embodiment.

FIG. 9 is a flowchart for explaining the main portion of the control operation of the electronic control device, i.e., the control operation for reducing the rattling noise without changing the engine rotation speed, and depicts another embodiment corresponding to the flowchart of FIG. 6.

MODES FOR CARRYING OUT THE INVENTION

Figure 1:
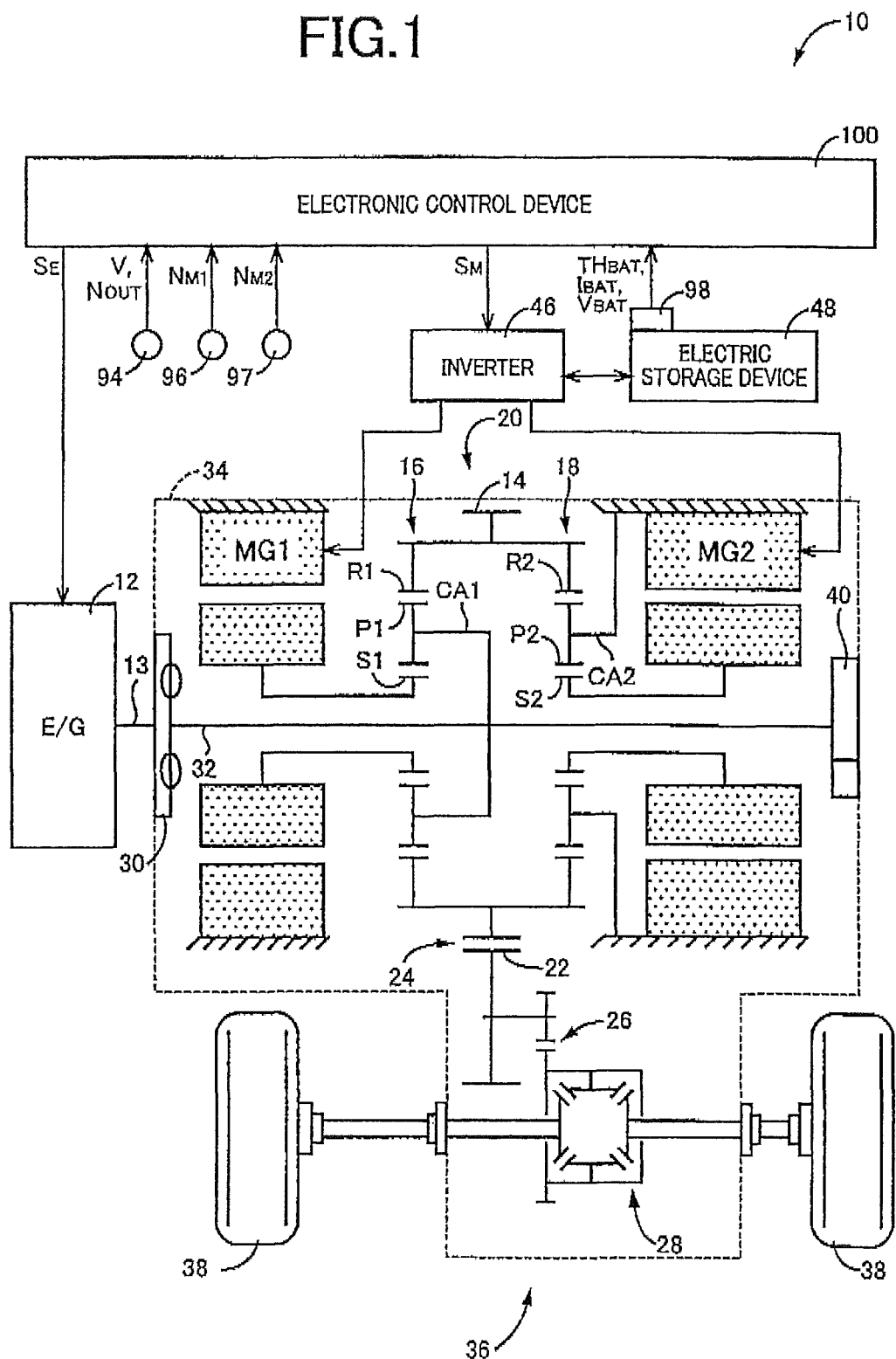
FIG. 1 is a diagram for explaining a general configuration of a hybrid vehicle to which the present invention is applied, and is a block diagram for explaining a main portion of a control system disposed on the vehicle.

In the present invention, preferably, the electric motor for running is coupled directly or indirectly via a gear mechanism to an output rotating member of the differential mechanism in a power transmittable manner. The gear mechanism is made up of, for example, a gear pair coupling two shafts to each other in a power transmittable manner, a single stage speed reducer or speed increaser made up of a differential gear device such as planetary gears and bevel gears, various planetary gear type multi-stage transmissions having, for example, two forward speeds, three forward speeds, or more shift stages with a plurality of sets of rotating elements of a planetary gear device selectively coupled by friction engagement devices to achieve a plurality of gear stages (shift stages) in an alternative manner, etc.

Preferably, hydraulic friction engagement devices such as multi-plate and single-plate clutches and brakes engaged by a hydraulic actuator or belt type brakes are widely used for the friction engagement devices in the planetary gear type multi-stage transmission. Although an oil pump supplying operating oil for the engagement actuation of the hydraulic friction engagement devices may be, for example, an oil pump driven by an engine, i.e., a drive power source for running, to discharge the operating oil, the oil pump may be driven by a dedicated electric motor etc., disposed separately from the engine.

Preferably, the differential mechanism is a device having a first rotating element coupled to the engine, a second rotating element coupled to the differential electric motor, and a third rotating element coupled to the output shaft.

Preferably, the differential mechanism is a single pinion type planetary gear device; the first rotating element is a carrier of the planetary gear device; the second rotating element is a sun gear of the planetary gear device, and the third rotating element is a ring gear of the planetary gear device.

Preferably, a mounting orientation of the vehicle power transmission device relative to a vehicle may be that of a transversely mounted type as in the case of FF (front-engine front-drive) vehicles in which an axis line of a drive device is in the width direction of the vehicle or a longitudinally mounted type as in the case of FR (front-engine rear-drive) vehicles in which the axis line of the drive device is in the longitudinal direction of the vehicle.

Preferably, the engine and the differential mechanism may operatively be coupled in any manner and, for example, the engine and the differential mechanism may have a pulsation absorbing damper (vibration damping device), a direct clutch, a direct clutch with a damper, or a hydraulic power transmission device interposed therebetween, or the engine and the differential mechanism may always be coupled. A torque converter with a lockup clutch, a fluid coupling, etc., are used as the hydraulic power transmission device.

Embodiments of the present invention will now be described in detail with reference to the drawings.

First Embodiment

FIG. 1 is a diagram for explaining a general configuration of a hybrid vehicle 10 (hereinafter referred to as a vehicle 10) to which the present invention is applied, and is a block diagram for explaining a main portion of a control system disposed for controlling the portions of the vehicle 10. In FIG. 1, the vehicle 10 includes a transmission portion 20 having a power distribution mechanism 16 distributing power output from an engine 12 acting as a drive power source for running to a first electric motor MG1 and an output gear 14, a gear mechanism 18 coupled to the output gear 14, and a second electric motor MG2 coupled via the gear mechanism 18 to the output gear 14 in a power transmittable manner. The transmission portion 20 is preferably used in, for example, an FF (front-engine front drive) type vehicle in which the transmission portion 20 is transversely placed in the vehicle 10, and makes up a power transmission device 36 along with a counter gear pair 24 made up of the output gear 14 acting as an output rotating member of the transmission portion 20 (the power distribution mechanism 16) and a counter driven gear 22, a final gear pair 26, a differential gear device (final reduction gear) 28, a damper 30 operatively coupled to the engine 12, an input shaft 32 operatively coupled to the damper 30, etc., in a case 34 acting as a non-rotating member attached to a vehicle body. In the power transmission device 36 configured as described above, the power of the engine 12 and the power of the second electric motor MG2 input via the damper 30 and the input shaft 32 are transmitted to the output gear 14 and are then transmitted from the output gear 14 sequentially via the counter gear pair 24, the final gear pair 26, the differential gear device 28, etc., to a pair of drive wheels 38.

The input shaft 32 is coupled at one end via the damper 30 to the engine 12 to be rotationally driven by the engine 12. The input shaft 32 is coupled at the other end to an oil pump 40 acting as a lubrication oil supply device and, the oil pump 40 is rotationally driven by rotationally driving the input shaft 32 so that the lubrication oil is supplied to the portions of the power transmission device 36, for example, the power distribution mechanism 16, the gear mechanism 18, and ball bearings not depicted.

The power distribution mechanism 16 is made up of a known single pinion type planetary gear device including, as rotating elements (rotating members), a first sun gear S1, a first pinion gear P1, a first carrier CA1 supporting the first pinion gear P1 in a rotatable and revolvable manner, and a first ring gear R1 meshing via the first pinion gear P1 with the first sun gear S1, and functions as a differential mechanism generating a differential action. In this power distribution mechanism 16, the first carrier CA1 is coupled to the input shaft 32, i.e., the engine 12; the first sun gear S1 is coupled to the first electric motor MG1; and the first ring gear R1 is coupled to the output gear 14. As a result, the first sun gear S1, the first carrier CA1, and the first ring gear R1 are rotatable relative to each other; therefore, the output of the engine 12 is distributed to the first electric motor MG1 and the output gear 14; the first electric motor MG1 generates electricity from the output of the engine 12 distributed to the first electric motor MG1; the generated electric energy is accumulated via an inverter 46 into an electric storage device 48; the electric energy also rotationally drives the second electric motor MG2; and, therefore, the transmission portion 20 is put into, for example, a continuously variable transmission state (electric CVT state) to function as an electric continuously variable transmission having the rotation of the output gear 14 continuously varied regardless of a predetermined rotation of the engine 12. In other words, the transmission portion 20 acts as an electric differential portion (electric continuously variable transmission) with the differential state of the power distribution mechanism 16 controlled by controlling the operating state of the first electric motor MG1 acting as a differential electric motor. This enables the transmission portion 20 to operate the engine 12 at the operating point of the engine 12 (e.g., an operational point of the engine 12 defined by an engine rotation speed $N_E$ and an engine torque $T_E$; hereinafter referred to as an engine operating point) achieving the best fuel consumption, for example. This type of hybrid form is referred to as a mechanical distribution type or a split type.

The gear mechanism 18 is made up of a known single pinion type planetary gear device including, as rotating elements, a second sun gear S2, a second pinion gear P2, a second carrier CA2 supporting the second pinion gear P2 in a rotatable and revolvable manner, and a second ring gear R2 meshing via the second pinion gear P2 with the second sun gear S2. In the gear mechanism 18, the second carrier CA2 is coupled to, and prevented from rotating by, the case 34 that is a non-rotating member; the second sun gear S2 is coupled to the second electric motor MG2; and the second ring gear R2 is coupled to the output gear 14. For example, the gear mechanism 18 is configured to function as a speed reducer and, during power running while the second electric motor MG2 outputs a torque (drive power), the rotation of the second electric motor MG2 is reduced and transmitted to the output gear 14 while the torque thereof is increased and transmitted to the output gear 14. The ring gear R1 of the power distribution mechanism 16 and the ring gear R2 of the gear mechanism 18 are formed as an integrated compound gear and the output gear 14 is disposed on an outer circumferential portion thereof.

The first electric motor MG1 and the second electric motor MG2 are, for example, synchronous electric motors having at least one of a function as a motor generating mechanical drive power from electric energy and a function as an electric generator generating electric energy from mechanical drive power and preferably are motor generators selectively operated as a motor or an electric generator. For example, the first electric motor MG1 has a generator (electric generation) function for accepting a reaction force of the engine 12 and a motor (electric motor) function of rotationally driving the engine 12 during suspension of operation, and the second electric motor MG2 has an electric motor function for acting as an electric motor for running that outputs drive power as a drive power source for running and an electric generation function of generating electric energy through regeneration from reverse drive power from the drive wheels 38.

Figure 2:
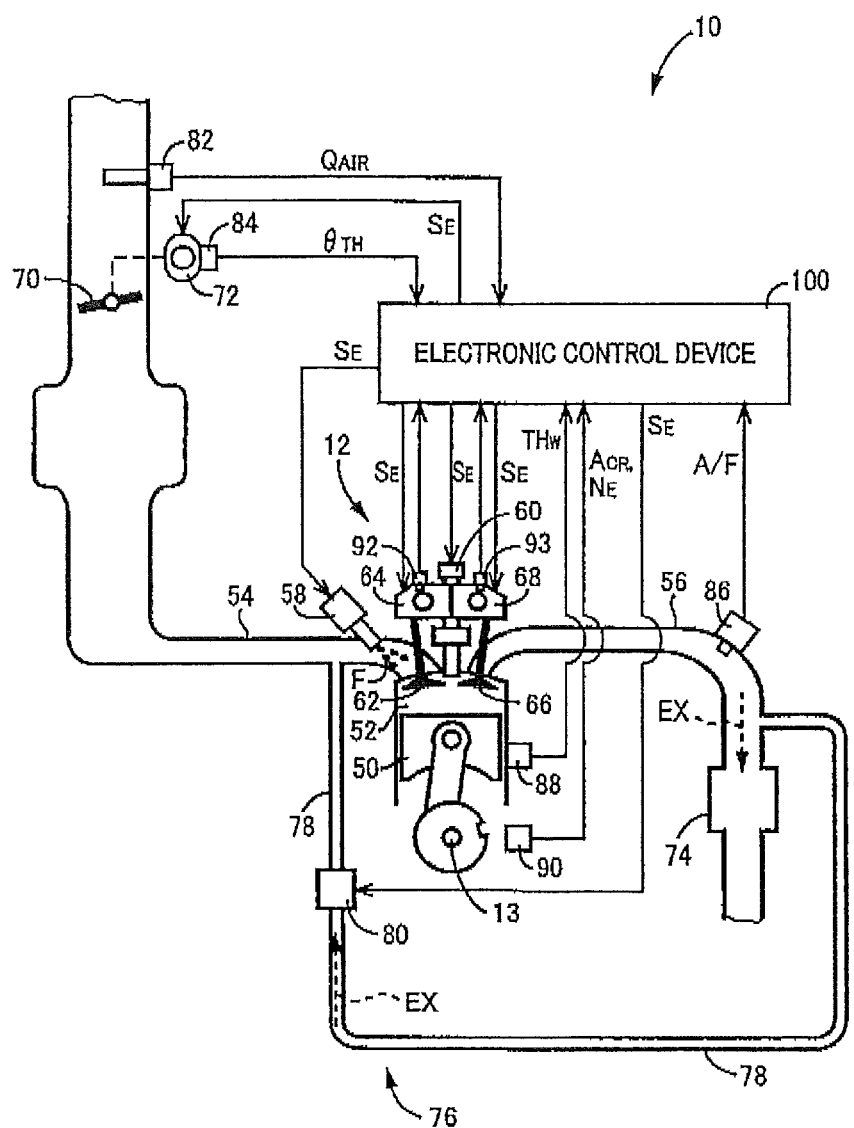
FIG. 2 is a diagram for explaining a general configuration of an engine and is a block diagram for explaining a main portion of a control system disposed on the vehicle for providing output control etc., of the engine.

FIG. 2 is a diagram for explaining a general configuration of the engine 12 and is a block diagram for explaining a main portion of a control system disposed on the vehicle 10 for providing output control etc., of the engine 12. In FIG. 2, the engine 12 is, for example, a known automotive gasoline engine and is, for example, an in-line four-cylinder engine in this embodiment although the engine 12 may be a single-cylinder engine or a multi-cylinder engine having two or more cylinders. The engine 12 is a four-stroke engine completing one cycle made up of an intake stroke, a compression stroke, an expansion stroke, and an exhaust stroke while a crankshaft 13 of the engine 12 rotates twice. The engine 12 includes a combustion chamber 52 disposed between a cylinder head and a piston 50, an intake pipe 54 connected to an intake port of the combustion climber 52, an exhaust pipe 56 connected to an exhaust port of the combustion chamber 52, a fuel injection device 58 disposed on the cylinder head and injecting and supplying fuel F into air (intake air, intake) sucked into the combustion chamber 52, an ignition device 60 igniting air-fuel mixture in the combustion chamber 52 made up of the fuel F injected and supplied by the fuel injection device 58 and the intake air, an intake valve 62 opening or closing the intake port of the combustion chamber 52, an intake valve drive device 64 reciprocating the intake valve 62 in synchronization with the rotation of the crankshaft 13 for opening/closing actuation, an exhaust valve 66 opening or closing the exhaust port of the combustion chamber 52, and an exhaust valve drive device 68 reciprocating the exhaust valve 66 in synchronization with the rotation of the crankshaft 13 for opening/closing actuation.

An electronic throttle valve 70 is disposed on an upstream portion in the intake pipe 54 of the engine 12 and the electronic throttle valve 70 is actuated and opened/closed by a throttle actuator 72. As a result, the engine 12 is driven and the air-fuel mixture after combustion is sent out as exhaust gas (exhaust air) EX into the exhaust pipe 56. The exhaust pipe 56 of the engine 12 includes a catalyst 74 and the exhaust gas EX generated by the combustion of the engine 12 passes through the exhaust pipe 56 and flows into the catalyst 74 to be purified by the catalyst 74 before discharged into the atmosphere. The catalyst 74 is made of a well-known three-way catalyst purifying carbon hydride (HC), carbon monoxide (CO), nitrogen oxide (NOX), etc., in the exhaust gas EX, for example.

The vehicle 10 includes an exhaust gas recirculation device (EGR device) 76 taking out and recirculating a portion of the exhaust gas EX from the exhaust pipe 56 of the engine 12 to return the gas again into the intake pipe 54 of the engine 12. The EGR device 76 includes, for example, an EGR pipe 78 communicating the intake pipe 54 with the exhaust pipe 56, and an EGR control valve 80 disposed in a portion in the middle of the pipe line of the EGR pipe 78 to control the communication and interruption of the exhaust gas EX recirculated from the exhaust pipe 56 to the intake pipe 54. The EGR control valve 80 is an electronic control valve electrically controlled and opened/closed by an actuator, for example.

In the engine 12, the fuel F is injected and supplied from the fuel injection device 58 into the intake air sucked from the intake pipe 54 into the combustion chamber 52 to form the air-fuel mixture, and the air-fuel mixture is ignited by the ignition device 60 and combusted in the combustion chamber 52. As a result, the engine 12 is driven and the air-fuel mixture after the combustion is sent out as the exhaust gas EX into the exhaust pipe 56. The exhaust gas EX recirculated to the intake pipe 54 out of the exhaust gas EX by opening the EGR control valve 80 is added to the intake air in the intake pipe 54 used at the next cycle. An air-fuel ratio A/F of the air-fuel mixture in the combustion chamber 52 is controlled depending on an operating state etc., of the vehicle 10 within a certain range, for example.

Although the intake valve drive device 64 basically performs the opening/closing actuation of the intake valve 62 in synchronization with the rotation of the crankshaft 13, the intake valve drive device 64 also has a function of changing opening/closing timing, a lift amount, etc., of the intake valve 62 as needed and acts as an intake valve opening/closing timing changing device changing the opening/closing timing of the intake valve 62, for example. Although various operating principles of the intake valve drive device 64 are generally known, the intake valve drive device 64 may be, for example, a cam mechanism operated in association with the rotation of the crankshaft 13, in which any of a plurality of cams having shapes different from each other is selectively used through hydraulic control or electric control for the opening/closing actuation of the intake valve 62, or may utilize the cam mechanism operated in association with the rotation of the crankshaft 13 along with a mechanism correcting the operation of the cams of the cam mechanism through hydraulic control or electric control so as to perform the opening/closing actuation of the intake valve 62. In short, for example, the intake valve drive device 64 is mainly made up of the cam mechanism and has a function as an intake valve opening/closing timing changing device advancing or delaying both the opening timing and the closing timing of the intake valve 62.

As is the case with the intake valve drive device 64, the exhaust valve drive device 68 basically performs the opening/closing actuation of the exhaust valve 66 in synchronization with the rotation of the crankshaft 13 and also has a function of changing opening/closing timing, a lift amount, etc., of the exhaust valve 66 as needed and acts as an exhaust valve opening/closing timing changing device changing the opening/closing timing of the exhaust valve 66, for example. The operating principle of the exhaust valve drive device 68 is the same as the intake valve drive device 64. In short, for example, the exhaust valve drive device 68 is mainly made up of the cam mechanism and has a function as an exhaust valve opening/closing timing changing device advancing or delaying both the opening timing and the closing timing of the exhaust valve 66.

As depicted in FIGS. 1 and 2, the vehicle 10 includes an electronic control device 100 including a control device of the vehicle 10 controlling the differential state of the power distribution mechanism 16 (shift state of the transmission portion 20), for example. The electronic control device 100 includes a so-called microcomputer including a CPU, a RAM, a ROM, and an I/O interface, for example, and the CPU executes signal processes in accordance with programs stored in advance in the ROM, while utilizing a temporary storage function of the RAM, to provide various controls of the vehicle 10. For example, the electronic control device 100 provides the vehicle control such as the hybrid drive control related to the engine 12, the first electric motor MG1, and the second electric motor MG2 and is configured separately for the output control of the engine 12 and the shift control of the transmission portion 20 as needed.

The electronic control device 100 is supplied with, for example, a signal indicative of an intake air amount $Q_{AIR}$ detected by an airflow meter 82 disposed on the upstream side of the intake pipe 54 relative to the electronic throttle valve 70; a signal indicative of a throttle valve opening degree $\theta_{TH}$ that is an opening angle of the electronic throttle valve 70 detected by a throttle valve opening degree sensor 84; a signal indicative of a state of the air-fuel ratio A/F in the exhaust gas EX detected by an air-fuel ratio sensor 86 disposed on the upstream side of the exhaust pipe 56 relative to the catalyst 74; a signal indicative of a cooling water temperature $TH_W$ of the engine 12 detected by a water temperature sensor 88; signals indicative of a rotation angle (position) $A_{CR}$ of the crankshaft 13 and an engine rotation speed $N_E$ that is a rotation speed of the engine 12 detected by a crank position sensor 90; signals indicative of the opening/closing timing and the lift amount of the intake valve 62 detected by an intake valve side cam position sensor 92; signals indicative of the opening/closing timing and the lift amount of the exhaust valve 66 detected by an exhaust valve side cam position sensor 93; a signal indicative of an output rotation speed $N_{OUT}$ that is a rotation speed of the output gear 14 corresponding to a vehicle speed V detected by an output rotation speed sensor 94; a signal indicative of a first electric motor rotation speed $N_{M1}$ that is a rotation speed of the first electric motor MG1 detected by a first electric motor rotation speed sensor 96; a signal indicative of a second electric motor rotation speed $N_{M2}$ that is a rotation speed of the second electric motor MG2 detected by a second electric motor rotation speed sensor 97; and signals indicative of a battery temperature $TH_{BAT}$, a battery input/output current (battery charging/discharging current) $I_{BAT}$, and a battery voltage $V_{BAT}$ of the electric storage device 48 detected by a battery sensor 98. The electronic control device 100 is also supplied with a signal indicative of the presence of a switch operation for setting a motor running (EV running) mod; a signal indicative of the presence of a brake pedal operation, a signal indicative of an accelerator opening degree Acc that is an accelerator pedal operation amount acting as a drive power request amount (driver request output) of a driver to the vehicle 10, eta, from sensors and switches not depicted. The electronic control device 100 sequentially calculates a state of charge (charging capacity) SOC of the electric storage device 48 based on the battery temperature $TH_{BAT}$, the battery charging/discharging current $I_{BAT}$, and the battery voltage $V_{BAT}$, for example.

The electronic control device 100 outputs, for example, an engine output control command signal $S_E$ for the output control of the engine 12, such as a drive signal to the throttle actuator 72 for controlling the throttle valve opening degree $\theta_{TH}$ such that the throttle valve opening degree $\theta_{TH}$ basically increases as the accelerator opening degree Acc increases, a fuel supply amount signal controlling an injection supply amount (fuel injection amount) FUEL of the fuel F of the fuel injection device 58, an ignition signal commanding the timing of ignition of the engine 12 by the ignition device 60, an intake valve opening/closing timing signal commanding the timing of the opening/closing of the intake valve 62 by the intake valve drive device 64, an exhaust valve opening/closing timing signal commanding the timing of the opening/closing of the exhaust valve 66 by the exhaust valve drive device 68, and an EGR amount control signal to the EGR control valve 80 for controlling increase/decrease of an exhaust gas recirculation amount (EGR amount) by controlling the opening/closing of the EGR control valve 80. The electronic control device 100 also outputs an electric motor control command signal $S_M$ to the inverter 46 for controlling the operation of the first electric motor MG1 and the second electric motor MG2, for example.

Figure 3:
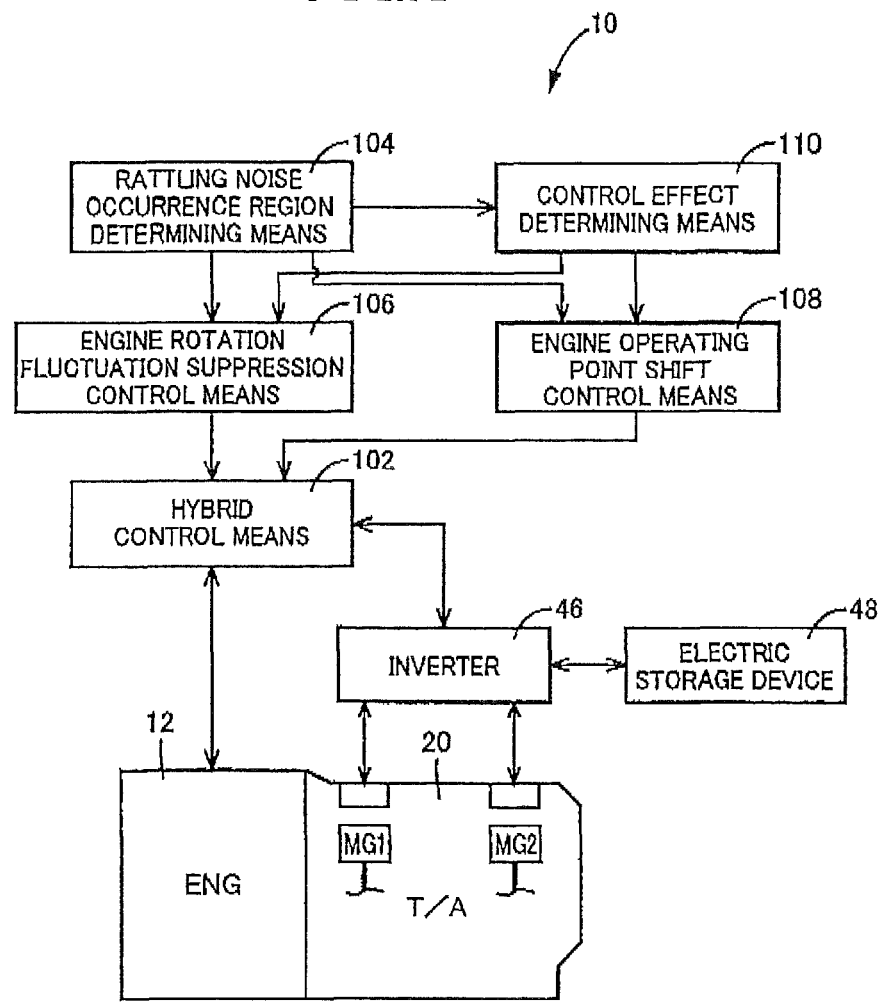
FIG. 3 is a functional block diagram for explaining a main portion of a control function of an electronic control device.

FIG. 3 is a functional block diagram for explaining a main portion of a control function of the electronic control device 100. In FIG. 3, a hybrid control portion, Le., a hybrid control means 102 selectively establishes, for example, a motor running mode using only the second electric motor MG2 as a drive source with the engine 12 stopped; an engine running mode (steady running mode) accepting a reaction force to the power of the engine 12 with the electric generation of the first electric motor MG1 to transmit an engine direct torque to the output gear 14 (drive wheels 22) while the second electric motor MG2 is driven by the generated electric power of the first electric motor MG1 to transmit a torque to the output gear 14 for running; an assist running mode (acceleration running mode) farther adding the drive power of the second electric motor MG2 using electric power from the electric storage device 48 for running in the engine running mod; etc., depending on a running state.

Specifically describing the control in the engine running mode by way of example, the hybrid control means 102 operates the engine 12 in an efficient operation range while optimally changing the distribution of the drive power between the engine 12 and the second electric motor MG2 and the reaction force due to the electric generation of the first electric motor MG1 so as to control a gear ratio γ0 (=engine rotation speed $N_E$/output rotation speed $N_{OUT}$) as an electric continuously variable transmission of the transmission portion 20. For example, the hybrid control means 102 calculates a target output of the vehicle 10 from the accelerator opening degree Acc and the vehicle speed V, calculates a necessary total target output from the target output and a charge request value, and calculates a target engine power $P_E^*$ such that the total target output is acquired in consideration of a transmission loss, an assist torque of the second electric motor MG2, an accessory load, etc. The hybrid control means 102 controls the engine 12 while controlling an amount of electric generation of the first electric motor MG1 so as to achieve an engine operating point, i.e., the engine rotation speed $N_E$ and the engine torque $T_E$, at which the target engine power $P_E^*$ can be acquired while operating the engine 12 along a predetermined engine optimum fuel consumption line (fuel consumption map) as indicated by a solid line of FIG. 4 empirically obtained in advance for satisfying both the drivability and the fuel consumption property, for example. The engine operating point is an operating point indicative of the operating state of the engine 12 in the two-dimensional coordinates with a coordinate axis of a state amount indicative of the operating state of the engine 12 exemplarily indicated by the engine rotation speed $N_E$ and the engine torque $T_E$. In this embodiment, fuel consumption refers to, for example, a running distance per unit fuel consumption amount, or a fuel consumption rate (=fuel consumption amount/drive wheel output) of a vehicle as a whole.

The hybrid control means 102 outputs the engine output control command signals $S_E$ to control the opening/closing of the electronic throttle valve 70 with the throttle actuator 72 for throttle control, to control a fuel injection amount FUEL and the timing of the injection by the fuel injection device 58 for fuel injection control, and to control the timing of ignition by the ignition device 60 for ignition timing control and provides the output control of the engine 12 such that the engine torque $T_E$ for generating the target engine power $P_E^*$ is acquired. The hybrid control means 102 outputs a command for controlling the electric generation by the first electric motor MG1 to the inverter 46 to control the first electric motor rotation speed $N_{M1}$ so as to acquire the engine rotation speed $N_E$ for generating the target engine power $P_E^*$.

The hybrid control means 102 can control the first electric motor rotation speed $N_{M1}$ with the differential action of the power distribution mechanism 16 so that the engine rotation speed $N_E$ is maintained substantially constant or controlled to an arbitrary rotation speed, regardless of whether the vehicle is stopped or running, i.e., regardless of the output rotation speed $N_{OUT}$ restrained by the vehicle speed V (the drive wheels 38). For example, if the engine rotation speed $N_E$ is increased during vehicle running, the hybrid control means 102 increases the first electric motor rotation speed $N_{M1}$.

The hybrid control means 102 controls the exhaust gas recirculation (EGR) by the EGR device 76 based on the operating state of the engine 12, for example. Specifically, while the engine is cold, such as before completion of warm-up of the engine 12, the hybrid control means 102 outputs a command for closing (completely closing) the EGR control valve 80 so as not to perform the EGR. After completion of warm-up of the engine 12, the hybrid control means 102 outputs a command for opening the EGR control valve 80 so as to control an EGR amount based on the cooling water temperature $TH_W$, the engine rotation speed $N_E$, the engine loads (e.g., the intake air amount $Q_{AIR}$, the throttle valve opening degree $\theta_{TH}$), the air-fuel ratio A/F, etc., thereby executing the EGR. Even while the engine is cold, if the engine 12 is in the operating state ensuring (not impairing) the combustion stability of the engine 12, for example, if the engine 12 is in the operating state in which the combustion of the engine 12 is stable with smaller output torque fluctuations at a high rotation speed and a high load, the EGR may be performed.

Figure 5:
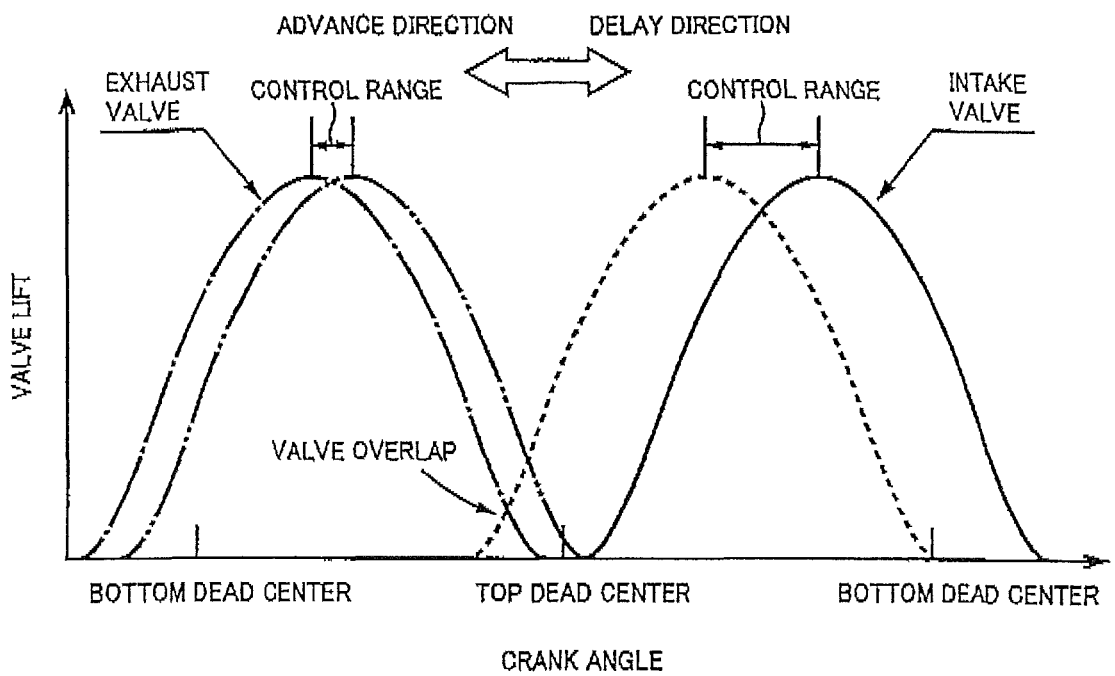
FIG. 5 is a diagram of an example of a normal control range (a solid line and a broken line) in timings of opening and closing an intake valve by an intake valve drive device and a normal control range (a dashed-dotted line and a dashed-two dotted line) in timings of opening and closing an exhaust valve by an exhaust valve drive device.

The hybrid control means 102 controls, for example, the timing of the opening/closing of the intake valve 62 by the intake valve drive device 64 and controls the timing of the opening/closing of the exhaust valve 66 by the exhaust valve drive device 68 so as to achieve, for example, lower fuel consumption, higher output, and lower emission. Specifically, the hybrid control means 102 outputs a command (intake valve opening/closing timing signal) for advancing or delaying both or one of the timings of opening and closing the intake valve 62 by the intake valve drive device 64 within a certain normal control range indicated by a solid line and a broken line of FIG. 5 depending on an operating state etc., of the vehicle 10. The hybrid control means 102 outputs a command (exhaust valve opening/closing timing signal) for advancing or delaying both or one of the timings of opening and closing the exhaust valve 66 by the exhaust valve drive device 68 within a certain normal control range indicated by a dashed-dotted line and a dashed-two dotted line of FIG. 5 depending on an operating state etc., of the vehicle 10.

In the power transmission device 36 of this embodiment, if a second electric motor torque $T_{M2}$ is in a no-load state of the second electric motor MG2, i.e., close to substantially zero including the value zero [Nm], a pressing force is weak between gears meshed with each other in the gear mechanism 18 coupled to the second electric motor MG2 and the gears are in a gear floating state. When such a gear floating state is present in the engine running mode, if explosion fluctuations of the engine 12 (engine explosion fluctuations, engine rotation fluctuations) having a force greater than the pressing force are transmitted to the gear mechanism 18, a gear bearing noise, i.e., so-called rattling noise may occur. Therefore, the rattling noise may occur in the gear mechanism 18 depending on a degree of the second electric motor torque $T_{M2}$ in the engine running mode. In this embodiment, a predetermined range of the second electric motor torque $T_{M2}$ possibly generating such a rattling noise is referred to as a rattling noise occurrence region (gear bearing noise occurrence region) G. This rattling noise occurrence region G is, for example, a torque region empirically obtained and set in advance as a range of the second electric motor torque $T_{M2}$ in which the rattling noise easily occurs due to the engine rotation fluctuations between gears (gears) of the gear mechanism 18, and is defined as a region between a negative rattling noise occurrence threshold value (−A) [Nm] and a positive rattling noise occurrence threshold value (A) [Nm] (A>0).

Figure 4:
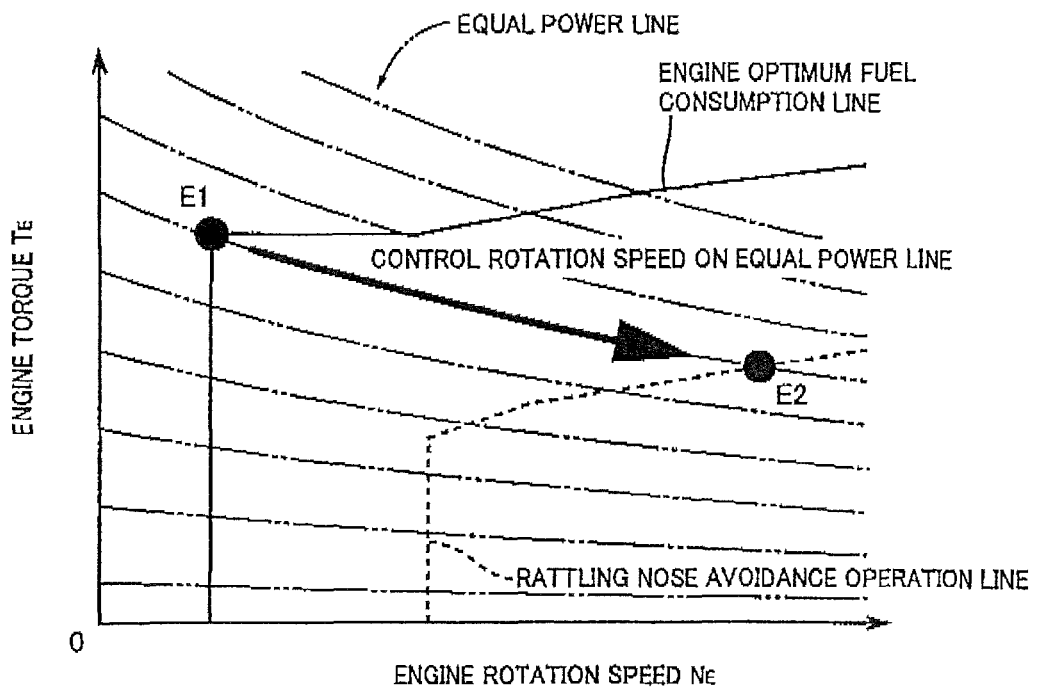
FIG. 4 is a diagram of an example of an engine optimum fuel consumption line and a rattling noise avoidance operation line.

With regard to the occurrence of such a rattling noise, in this embodiment, for example, if the second electric motor torque $T_{M2}$ is within the rattling noise occurrence region G, engine operating point shift control can be provided to shift the engine operating point, which is operated along an engine optimum fuel consumption line as indicated by a solid line of FIG. 4 during normal running while the second electric motor torque $T_{M2}$ is out of the rattling noise occurrence region G, onto a gear bearing noise avoidance operation line (rattling noise avoidance operation line), for example, as indicated by a broken line of FIG. 4 empirically obtained and set in advance for avoiding the gear bearing noise due to the engine rotation fluctuations between gears (e.g., in the gear mechanism 18) of the transmission portion 20, so as to reduce the rattling noise. In this engine operating point shift control, as depicted in FIG. 4, for example, while equal power is maintained so that the target engine power $P_E^*$ is acquired, the engine operating point is shifted from the engine optimum fuel consumption line (e.g., an engine operating point E1) onto the rattling noise avoidance operation line (an engine operating point E2). This rattling noise avoidance operation line causes the engine rotation speed $N_E$ to increase and the engine torque $T_E$ to decrease relative to the engine operating point on the engine optimum fuel consumption line, for example. As a result, the torque fluctuations of the engine 12 are suppressed and the rattling noise is reduced or avoided. From another viewpoint, since the decrease in the engine torque $T_E$ reduces the engine direct torque, the second electric motor torque $T_{M2}$ is increased by the reduction of the engine direct torque. As a result, the second electric motor torque $T_{M2}$ goes out of the rattling noise occurrence region G and, therefore, the rattling noise is reduced or avoided.

In the engine operating point shift control, the engine rotation speed $N_E$ is increased despite the absence of power-on such as deeper depression of an accelerator pedal, for example, and, therefore, a user may feel uncomfortable about a rapid increase in the engine rotation speed $N_E$. Thus, in this embodiment, if the second electric motor torque $T_{M2}$ is within the rattling noise occurrence region G, engine rotation fluctuation suppression control is provided to suppress the engine rotation fluctuations as compared to during normal running while the second electric motor torque $T_{M2}$ is out of the rattling noise occurrence region G, so as to reduce the rattling noise. Therefore, the engine rotation fluctuation suppression control of this embodiment suppresses the engine rotation fluctuations while suppressing a change in the engine rotation speed $N_E$ as compared to the engine operating point shift control shifting the engine operating point from the engine optimum fuel consumption line onto the rattling noise avoidance operation line to actively increase the engine rotation speed $N_E$ for reduction or avoidance of the rattling noise. Desirably, the engine rotation fluctuation suppression control suppresses the engine rotation fluctuations while suppressing a change in the engine rotation speed $N_E$ as much as possible, as compared to when the second electric motor torque $T_{M2}$ is out of the rattling noise occurrence region G. Therefore, the engine rotation fluctuation suppression control suppresses the engine rotation fluctuations without substantially changing the engine operating point as compared to when the second electric motor torque $T_{M2}$ is out of the rattling noise occurrence region G.

A specific form of the engine rotation fluctuation suppression control will hereinafter be described. A remaining amount of unburned gas contained in the exhaust gas varies and a remaining amount of unburned gas sucked into a cylinder is changed in each case of the EGR control. Therefore, if the EGR amount is larger, the fuel density in cylinders varies in each cylinder, resulting in greater explosion variations of the engine 12 between the cylinders and increasing the engine rotation fluctuations. Therefore, in this embodiment, EGR amount suppression control is provided as the engine rotation fluctuation suppression control to suppress the EGR amount or set the EGR amount to zero. As a result, the explosion variations of the engine 12 between cylinders can be suppressed and the engine rotation fluctuations can properly be suppressed without changing the engine operating point.

Depending on the timing of closing the exhaust valve 66 or the timing of opening the intake valve 62 in the exhaust stroke of the engine 12, a shift to the next intake stroke may be made with combustion gas remaining in a cylinder (the combustion chamber 52). Since a remaining amount of such combustion gas in the combustion chamber 52 can be handled as an amount equivalent to the EGR amount, the remaining amount is referred to as a self-EGR amount in this embodiment. Therefore, a remaining amount of unburned gas contained in the combustion gas in the exhaust stroke of the engine 12 varies, and a remaining amount of the unburned gas after completion of the exhaust stroke is changed. Thus, when the self-EGR amount is larger, the fuel density in cylinders varies in each cylinder, resulting in greater explosion variations of the engine 12 between the cylinders and increasing the engine rotation fluctuations. Therefore, in this embodiment, self-EGR amount suppression control is provided as the engine rotation fluctuation suppression control to suppress the self-EGR amount in the exhaust stroke of the engine 12 as compared to during the normal running while the second electric motor torque $T_{M2}$ is out of the rattling noise occurrence region G. As a result, the explosion variations of the engine 12 between cylinders can be suppressed and the engine rotation fluctuations can properly be suppressed without changing the engine operating point.

On a rich side (dense side) of the air-fuel ratio A/F of the air-fuel mixture when the fuel injection amount FUEL is relatively larger (from another viewpoint, the intake air amount $Q_{AIR}$ is relatively smaller), the engine 12 may tend to misfire and the explosion variations of the engine 12 may occur between the cylinders. Therefore, in this embodiment, lean-burn control is provided as the engine rotation fluctuation suppression control to shift the air-fuel ratio A/F of the air-fuel mixture to a lean side (thin side) as compared to during the normal running. As a result, while an average value of the rotationally fluctuating engine torque $T_E$ is maintained, only a peak value of the engine torque $T_E$ can be reduced, and the engine rotation fluctuations can properly be suppressed without changing the engine operating point.

The peak value of the engine torque $T_E$ is basically maximized if ignition is performed at the end stage of the compression stroke of the engine 12 (e.g., shortly before reaching a top dead center). Therefore, in this embodiment, ignition delay control is provided as the engine rotation fluctuation suppression control to delay the ignition timing of the engine 12 as compared to during the normal running. As a result, while the average value of the rotationally fluctuating engine torque $T_E$ is maintained, only the peak value of the engine torque $T_E$ can be reduced, and the engine rotation fluctuations can properly be suppressed without changing the engine operating point.

In the engine rotation fluctuation suppression control of this embodiment, one of the EGR amount suppression control, the self-EGR amount suppression control, the lean-burn control, and the ignition delay control is solely provided or two or more of these controls are provided in a combined manner. In other words, the engine rotation fluctuation suppression control is at least one of the EGR amount suppression control, the self-EGR amount suppression control, the lean-burn control, and the ignition delay control.

More specifically, returning to FIG. 3, a rattling noise occurrence region determining portion, i.e., a rattling noise occurrence region determining means 104 determines whether the second electric motor torque $T_{M2}$ is within the rattling noise occurrence region for example. Specifically, the rattling noise occurrence region determining means 104 determines whether an absolute value ($|T_{M2}|$) of an electric motor control command value to the second electric motor MG2 from the hybrid control means 102 is equal to or less than the rattling noise occurrence threshold value (A) [Nm] corresponding to the rattling noise occurrence region G.

If the rattling noise occurrence region determining means 104 determines that the second electric motor torque $T_{M2}$ is within the rattling noise occurrence region G, an engine rotation fluctuation suppression control portion, i.e., an engine rotation fluctuation suppression control means 106 outputs a rotation fluctuation suppression control command for providing the engine rotation fluctuation suppression control to the hybrid control means 102, thereby suppressing the engine rotation fluctuations without changing the engine operating point. For example, the engine rotation fluctuation suppression control means 106 outputs the rotation fluctuation suppression control command for providing the self-EGR amount suppression control to the hybrid control means 102, thereby suppressing the engine rotation fluctuations without changing the engine operating point. The engine rotation fluctuation suppression control means 106 may output the rotation fluctuation suppression control command for providing at least one of the EGR amount suppression control, the lean-burn control, and the ignition delay control, instead of the self-EGR amount suppression control. In other words, the engine rotation fluctuation suppression control means 106 outputs the rotation fluctuation suppression control command for solely providing one of the EGR amount suppression control, the self-EGR amount suppression control, the lean-burn control, and the ignition delay control or for providing these controls in a combined manner.

The hybrid control means 102 provides, for example, the self-EGR amount suppression control in accordance with the rotation fluctuation suppression control command from the engine rotation fluctuation suppression control means 106. Specifically, the hybrid control means 102 controls the exhaust valve 66 and the intake valve 62 at opening/closing timing obtained in advance for suppressing the self-EGR amount in the most effective manner (e.g., as close as possible to zero) so as to reduce the engine rotation fluctuations. More specifically, the hybrid control means 102 provides the control such that the timing of closing the exhaust valve 66 by the exhaust valve drive device 68 is set to the top dead center while the timing of opening the intake valve 62 by the intake valve drive device 64 is set to timing after the top dead center in the exhaust stroke of the engine 12. As described above, the hybrid control means 102 changes an amount of advance or delay of the intake valve 62 by the intake valve drive device 64 and/or an amount of advance or delay of the exhaust valve 66 by the exhaust valve drive device 68 as compared to during the normal control achieving the lower fuel consumption, higher output, and lower emission, such that the self-EGR amount is suppressed as much as possible at the time of transition from the exhaust stroke to the next intake stroke, so as to reduce the explosion variations of the engine 12 between the cylinders, thereby properly suppressing the engine rotation fluctuations without shifting the engine operating point from the engine optimum fuel consumption line.

The hybrid control means 102 may provide the control for closing the EGR control valve 80. In other words, the hybrid control means 102 changes the EGR control valve 80 such that the EGR amount is suppressed as much as possible so as to reduce the explosion variations of the engine 12 between the cylinders, thereby properly suppressing the engine rotation fluctuations without shifting the engine operating point from the engine optimum fuel consumption line.

The hybrid control means 102 may provide the control for reducing the fuel injection amount FUEL of the fuel injection device 58 during the normal running relative to the intake air amount $Q_{AIR}$ to shift the air-fuel ratio A/F to the lean side as compared to during the normal running. In other words, the hybrid control means 102 shifts the air-fuel ratio A/F to the lean side such that only the peak value of the engine torque $T_E$ is reduced as compared to during the normal running while the average value of the rotationally fluctuating engine torque $T_E$ is maintained, thereby properly suppressing the engine rotation fluctuations without shifting the engine operating point from the engine optimum fuel consumption line.

The hybrid control means 102 may provide the control for delaying the timing of ignition by the ignition device 60 during the normal running. In other words, the hybrid control means 102 delays the ignition timing such that only the peak value of the engine torque $T_E$ is reduced as compared to during the normal running while the average value of the rotationally fluctuating engine torque $T_E$ is maintained, thereby properly suppressing the engine rotation fluctuations without shifting the engine operating point from the engine optimum fuel consumption line.

Figure 6:
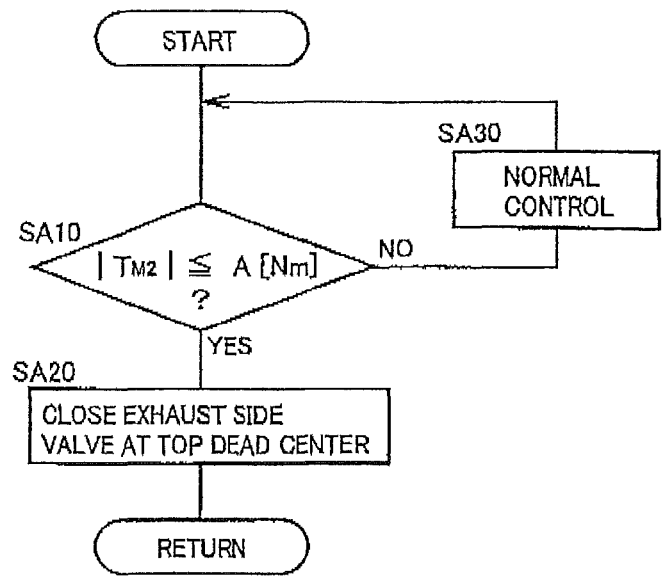
FIG. 6 is a flowchart for explaining a main portion of a control operation of the electronic control device, i.e., a control operation for reducing a rattling noise without changing an engine rotation speed.

FIG. 6 is a flowchart for explaining a main portion of the control operation of the electronic control device 100, i.e., a control operation for reducing the rattling noise without changing the engine rotation speed $N_E$ and is repeatedly executed with an extremely short cycle time, for example, on the order of few msec to a few tens of msec.

In FIG. 6, first, at step (hereinafter, "step" will be omitted) SA10 corresponding to the rattling noise occurrence region determining means 104, for example, based on whether the absolute value ($|T_{M2}|$) of the electric motor control command value to the second electric motor MG2 is equal to or less than the rattling noise occurrence threshold value (A) [Nm], it is determined whether the second electric motor torque $T_{M2}$ is within the rattling noise occurrence region G. If the determination at SA10 is affirmative, at SA20 corresponding to the engine rotation fluctuation suppression control means 106 and the hybrid control means 102, the rotation fluctuation suppression control command is output for providing the self-EGR amount suppression control that is one of the engine rotation fluctuation suppression controls and the control is provided such that the timing of closing the exhaust valve 66 by the exhaust valve drive device 68 is set to the top dead center while the timing of opening the intake valve 62 by the intake valve drive device 64 is set to timing after the top dead center in the exhaust stroke of the engine 12. Therefore, the respective advance amounts or delay amounts of the intake valve 62 and the exhaust valve 66 are changed at the time of transition from the exhaust stroke to the intake stroke as compared to during normal control such that no unburned gas remains in the combustion chamber 52 so as to reduce the explosion variations of the engine 12 between the cylinders, thereby suppressing the engine rotation fluctuations without shifting the engine operating point from the engine optimum fuel consumption line. At SA20, the EGR amount suppression control, the lean-burn control, or the ignition delay control may be provided instead of the self-EGR amount suppression control using the exhaust valve drive device 68. Two or more of the self-EGR amount suppression control, the EGR amount suppression control, the lean-burn control, and the ignition delay control may be provided in a combined manner. On the other hand, if the determination at SA10 is negative, the normal control other than the engine rotation fluctuation suppression control is provided at SA30.

As described above, according to this embodiment, if the second electric motor torque $T_{M2}$ is within the rattling noise occurrence region G, the engine rotation fluctuation suppression control is provided to suppress the engine rotation fluctuations as compared to during normal running while the second electric motor torque $T_{M2}$ is out of the rattling noise occurrence region G and, therefore, the engine rotation fluctuations can be suppressed to reduce the rattling noise without changing the engine rotation speed $N_E$. Thus, the rattling noise can be reduced without giving an uncomfortable feeling to a user due to a change in the engine rotation speed $N_E$.

Specifically, since the engine rotation fluctuation suppression control includes at least one of the EGR amount suppression control, the self-EGR amount suppression control, the lean-burn control, and the ignition delay control, the engine rotation fluctuations can properly be suppressed without changing the engine rotation speed $N_E$ (in an extreme case, without changing the engine operating point). For example, the EGR amount suppression control can suppress the explosion variations between the cylinders generated because a larger EGR amount causes the fuel density in the cylinders to vary in each cylinder due to variations in the remaining amount of unburned gas contained in the exhaust gas and, therefore, the engine rotation fluctuations can properly be suppressed without changing the engine operating point. The self-EGR amount suppression control can suppress the explosion variations between the cylinders generated because a larger remaining amount of the combustion gas causes the fuel density in the cylinders to vary in each cylinder due to variations in the remaining amount of the unburned gas contained in the combustion gas in the combustion chamber 52 and, therefore, the engine rotation fluctuations can properly be suppressed without changing the engine operating point. The lean-burn control can reduce only the peak value of the engine torque $T_E$ while the average value of the rotationally fluctuating engine torque $T_E$ is maintained and, therefore, the engine rotation fluctuations can properly be suppressed without changing the engine operating point. The ignition delay control can reduce only the peak value of the engine torque $T_E$ while the average value of the rotationally fluctuating engine torque $T_E$ is maintained and, therefore, the engine rotation fluctuations can properly be suppressed without changing the engine operating point.

According to this embodiment, since the rattling noise occurrence region G is, for example, a torque region empirically obtained and set in advance as a range of the second electric motor torque $T_{M2}$ in which the rattling noise easily occurs due to the engine rotation fluctuations between gears of the gear mechanism 18, if the second electric is motor torque $T_{M2}$ is within the rattling noise occurrence region G, the engine rotation fluctuations can properly be suppressed without changing the engine operating point.

Other embodiments of the present invention will be described. In the following description, the portions common to the embodiments are denoted by the same reference numerals and will not be described.

Second Embodiment

In the embodiment, if the second electric motor torque $T_{M2}$ is within the rattling noise occurrence region G, the engine rotation fluctuation suppression control is provided to suppress the engine rotation fluctuations without changing the engine operating point from the engine optimum fuel consumption line. Apart from this engine rotation fluctuation suppression control, the engine operating point shift control is also described in detail that shifts the engine operating point from the engine optimum fuel consumption line onto the rattling noise avoidance operation line to actively increase the engine rotation speed $N_E$ for reduction or avoidance of the rattling noise. Comparing the engine rotation fluctuation suppression control with the engine operating point shift control in terms of fuel consumption, the engine rotation fluctuation suppression control not changing the engine operating point from the engine optimum fuel consumption line seems advantageous.

In the EGR amount suppression control, the self-EGR amount suppression control, the lean-burn control, and the ignition delay control, the fuel consumption may deteriorate due to deterioration of engine efficiency even if the engine operating point is the same. Therefore, in the engine rotation fluctuation suppression control, even if the engine operating point is not changed from the engine optimum fuel consumption line acquired before providing the engine rotation fluctuation suppression control, the engine optimum fuel consumption line itself varies and, therefore, the fuel consumption may deteriorate as compared to the engine operating point shift control. In other words, the fuel consumption deterioration may be suppressed more in the engine operating point shift control as compared to the engine rotation fluctuation suppression control. Therefore, in this embodiment, instead of or in addition to the embodiment, if the second electric motor torque $T_{M2}$ is within the rattling noise occurrence region G, one of the engine rotation fluctuation suppression control and the engine operating point shift control is selected and provided such that the fuel consumption deterioration is more suppressed at the time of provision of the control.

More specifically, returning to FIG. 3, if the rattling noise occurrence region determining means 104 determines that the second electric motor torque $T_{M2}$ is within the rattling noise occurrence region G, an engine operating point shift control portion, i.e., an engine operating point shift control means 108 outputs an operating point shift control command for providing the engine operating point shift control to the hybrid control means 102 to actively increase the engine rotation speed $N_E$, thereby reducing or avoiding the rattling noise.

The hybrid control means 102 shifts the engine operating point from the engine optimum fuel consumption line to the rattling noise avoidance operation line, for example, while maintaining the equal power such that the target engine power $P_E^*$ can be acquired, in accordance with the operating point shift control command from the engine operating point shift control means 108. Specifically, the hybrid control means 102 increases the engine rotation speed $N_E$ with the first electric motor MG1 to the engine rotation speed $N_E$ corresponding to an engine operating point on the rattling noise avoidance operation line at which the equal power is maintained, while reducing the engine torque $T_E$ through the control of the throttle valve opening degree $\theta_{TH}$ with the throttle actuator 72 to the engine torque $T_E$ corresponding to the engine operating point on the rattling noise avoidance operation line.

If the rattling noise occurrence region determining means 104 determines that the second electric motor torque $T_{M2}$ is within the rattling noise occurrence region G, a control effect determining portion, i.e., a control effect determining means 110 selects one of the engine rotation fluctuation suppression control and the engine operating point shift control such that the fuel consumption deterioration is more suppressed at the time of provision of the control. Specifically, the control effect determining means 110 calculates fuel consumption A in the case of controlling the engine operating point along the engine optimum fuel consumption line, fuel consumption B in the case of providing the engine rotation fluctuation suppression control, and fuel consumption C in the case of providing the engine operating point shift control and selects the control having a smaller fuel consumption different from the fuel consumption A, i.e., the control suppressing the fuel consumption deterioration from the fuel consumption A, out of the engine rotation fluctuation suppression control and the engine operating point shift control. Therefore, the control effect determining means 110 determines whether the engine operating point shift control has a greater effect of suppressing the fuel consumption deterioration than the engine rotation fluctuation suppression control.

If the control effect determining means 110 selects the engine operating point shift control as the control in which the fuel consumption deterioration is more suppressed at the time of provision of the control between the engine rotation fluctuation suppression control and the engine operating point shift control, the engine operating point shift control means 108 outputs an operating point shift control command for providing the engine operating point shift control to the hybrid control means 102 to actively increase the engine rotation speed $N_E$, thereby reducing or avoiding the rattling noise.

If the control effect determining means 110 selects the engine rotation fluctuation suppression control as the control in which the fuel consumption deterioration is more suppressed at the time of provision of the control between the engine rotation fluctuation suppression control and the engine operating point shift control, the engine rotation fluctuation suppression control means 106 outputs a rotation fluctuation suppression control command for providing the engine rotation fluctuation suppression control to the hybrid control means 102 to suppress the engine rotation fluctuations without changing the engine operating point.

Figure 7:
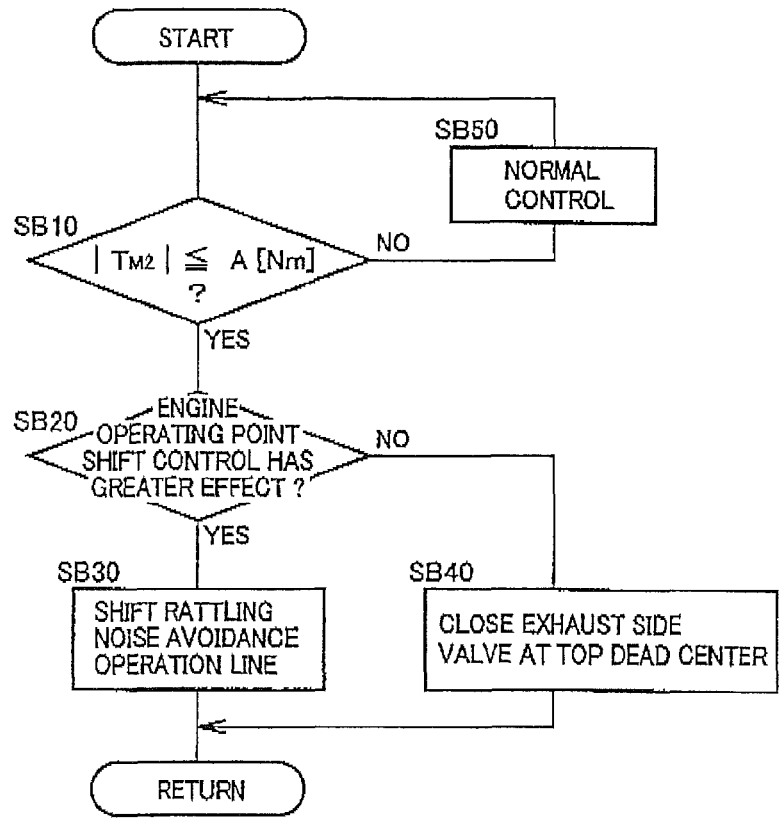
FIG. 7 is a flowchart for explaining the main portion of the control operation of the electronic control device, i.e., the control operation for reducing the rattling noise without changing the engine rotation speed, and depicts another embodiment corresponding to the flowchart of FIG. 6.

FIG. 7 is a flowchart for explaining the main portion of the control operation of the electronic control device 100, i.e. the control operation for reducing the rattling noise without changing the engine rotation speed $N_E$ and is repeatedly executed with an extremely short cycle time, for example, on the order of few msec to a few tens of msec. FIG. 7 depicts another embodiment corresponding to the flowchart of FIG. 6.

In FIG. 7, first, at SB10 corresponding to the rattling noise occurrence region determining means 104, for example, based on whether the absolute value ($|T_{M2}|$) of the electric motor control command value to the second electric motor MG2 is equal to or less than the rattling noise occurrence threshold value (A) [Nm], it is determined whether the second electric motor torque $T_{M2}$ is within the rattling noise occurrence region G. If the determination at SB10 is affirmative, at SB20 corresponding to the control effect determining means 110, it is determined whether the engine operating point shift control has a greater effect of suppressing the fuel consumption deterioration than the engine rotation fluctuation suppression control. If the determination at SB20 is affirmative, at SB30 corresponding to the engine operating point shift control means 108 and the hybrid control means 102, the operating point shift control command for providing the engine operating point shift control is output and, while the equal power is maintained, the engine operating point is shifted from the engine optimum fuel consumption line onto the rattling noise avoidance operation line so as to increase the engine rotation speed $N_E$, thereby reducing or avoiding the rattling noise. On the other hand, if the determination at SB20 is negative, at SB40 corresponding to the engine rotation fluctuation suppression control means 106 and the hybrid control means 102, as is the case with SA20 of FIG. 6 in the embodiment, the rotation fluctuation suppression control command for providing the engine rotation fluctuation suppression control is output to suppress the engine rotation fluctuations without shifting the engine operating point from the engine optimum fuel consumption line. On the other hand, if the determination at SB10 is negative, the normal control other than the engine operating point shift control and the engine rotation fluctuation suppression control is provided at SB50.

As described above, according to this embodiment, if the second electric motor torque $T_{M2}$ is within the rattling noise occurrence region G, one of the engine rotation fluctuation suppression control and the engine operating point shift control is selected and performed such that the fuel consumption deterioration is more suppressed at the time of provision of the control and, therefore, as compared to the case of reducing the rattling noise through only the engine rotation fluctuation suppression control and the case of reducing the rattling noise through only the engine operating point shift control, the fuel consumption deterioration can be minimized when the control for reducing the rattling noise is provided. From another viewpoint, the fuel consumption can be improved when the control is provided for reducing the rattling noise.

Third Embodiment

In the embodiments, each of the engine rotation fluctuation suppression control and the engine operating point shift control is solely provided. Even when rattling noise can be reduced, the engine rotation fluctuation suppression control may not be able to avoid the rattling noise alone. As described above, the engine operating point shift control may give an uncomfortable feeling to a user due to an increase in the engine rotation speed $N_E$. In this regard, it is found out that if the rattling noise is reduced to some extent by the engine rotation fluctuation suppression control, the rattling noise avoidance operation line can be set with an increase in the engine rotation speed $N_E$ suppressed to some extent in the engine operating point shift control. Therefore, in this embodiment, if the second electric motor torque $T_{M2}$ is within the rattling noise occurrence region G, the engine rotation fluctuation suppression control and the engine operating point shift control are provided in a combined manner.

In this embodiment, a rattling noise avoidance operation line B is adaptively set in advance to be used for the engine operating point shift control while the engine rotation fluctuation suppression control is provided, as indicated by a broken line with longer segments of FIG. 8. In the case of the rattling noise avoidance operation line B, as compared to a rattling noise avoidance operation line A (same as the rattling noise avoidance operation line depicted in FIG. 4) indicated by a broken line with shorter segments of FIG. 8 used when only the engine operating point shift control is solely provided, since the rattling noise is reduced to some extent by the engine rotation fluctuation suppression control, an increase in the engine rotation speed $N_E$ is suppressed and a decrease in the engine torque $T_E$ is suppressed relative to the operating point on, the engine optimum fuel consumption line. If the provision of the engine rotation fluctuation suppression control is presupposed, the hybrid control means 102 shifts the engine operating point from the engine optimum fuel consumption line (e.g., an engine operating point E1) onto the rattling noise avoidance operation line B (an engine operating point E3), for example, while maintaining the equal power at which the target engine power $P_E^*$ can be acquired, in accordance with the operating point shift control command from the engine operating point shift control means 108. By using the rattling noise avoidance operation line B in the engine operating point shift control, the change in the engine rotation speed $N_E$ can be suppressed as compared to using the rattling noise avoidance operation line A.

FIG. 9 is a flowchart for explaining the main portion of the control operation of the electronic control device 100, i.e., the control operation for reducing the rattling noise without changing the engine rotation speed $N_E$ and is repeatedly executed with an extremely short cycle time, for example, on the order of few msec to a few tens of msec. FIG. 9 depicts another embodiment corresponding to the flowchart of FIG. 6.

In FIG. 9, first, at SC10 corresponding to the rattling noise occurrence region determining means 104, for example, based on whether the absolute value ($|M_{M2}|$) of the electric motor control command value to the second electric motor MG2 is equal to or less than the rattling noise occurrence threshold value (A) [Nm], it is determined whether the second electric motor torque $T_{M2}$ is within the rattling noise occurrence region G. If the determination at SC10 is affirmative, at SC20 corresponding to the engine rotation fluctuation suppression control means 106 and the hybrid control means 102, as is the case with SA20 of FIG. 6 of the embodiment, the rotation fluctuation suppression control command for providing the engine rotation fluctuation suppression control is output to suppress the engine rotation fluctuations without shifting the engine operating point from the engine optimum fuel consumption line. At SC30 corresponding to the engine operating point shift control means 108 and the hybrid control means 102, the operating point shift control command for providing the engine operating point shift control is output and, while the equal power is maintained, the engine operating point is shifted from the engine optimum fuel consumption line onto the rattling noise avoidance operation line B (see the broken line with longer segments of FIG. 8) adapted in advance to the state in which the engine rotation fluctuation suppression control is provided, so as to increase the engine rotation speed $N_E$, thereby reducing or avoiding the rattling noise. On the other hand, if the determination at SC10 is negative, the normal control other than the engine operating point shift control and the engine rotation fluctuation suppression control is provided at SC40.

As described above, according to this embodiment, if the second electric motor torque $T_{M2}$ is within the rattling noise occurrence region G, the engine rotation fluctuation suppression control and the engine operating point shift control are provided in a combined manner and, therefore, the rattling noise can be reduced as much as possible, as compared to reducing the rattling noise through only the engine rotation fluctuation suppression control. Since the rattling noise avoidance operation line B can be set on the assumption that the rattling noise is reduced through the engine rotation fluctuation suppression control, when the engine operating point shift control is provided to shift the engine operating point from the engine optimum fuel consumption line onto the rattling noise avoidance operation line B, a change in the engine rotation speed $N_E$ can be made smaller as compared to the case of reducing the rattling noise through only the engine operating point shifting control.

Although the embodiments of the present invention have been described in detail with reference to the drawings, the present invention can be implemented by combining the embodiments with each other and is applicable in other forms.

For example, although the engine operating point shift control means 108 and the control effect determining means 110 are included in the functional block diagram of FIG. 3 in the embodiments, the engine operating point shift control means 108 and the control effect determining means 110 may not necessarily be included in the first embodiment and the control effect determining means 110 may not necessarily be included in the third embodiment.

Although a constant value is used as the rattling noise occurrence threshold value (A) [Nm] for determining whether the second electric motor torque $T_{M2}$ is within the rattling noise occurrence region G in the embodiments, the rattling noise occurrence threshold value may be a value having a hysteresis oriented to the direction of change in the second electric motor torque $T_{M2}$. If the rattling noise occurrence threshold value is a value having a hysteresis, the hysteresis can be made smaller in the engine rotation fluctuation suppression control since the engine operating point is not changed as compared to the engine operating point shift control, i.e., the engine operating line is not shifted between the engine optimum fuel consumption line and the rattling noise avoidance operation line.

Although whether the second electric motor torque $T_{M2}$ is within the rattling noise occurrence region G is simply determined in the embodiments, since the second electric motor torque $T_{M2}$ of zero is most severe in terms of the occurrence of the rattling noise, a control amount at the time of the engine rotation fluctuation suppression control may be changed depending on a value of the second electric motor torque $T_{M2}$ even when the second electric motor torque $T_{M2}$ is within the same rattling noise occurrence region G. In such a case, since the effect on the fuel consumption deterioration is considered to vary depending on the control amount, it is more effective to compare the engine rotation fluctuation suppression control and the engine operating point shift control in terms of fuel consumption.

Although the self-EGR amount is suppressed by the intake valve drive device 64 and the exhaust valve drive device 68 in the embodiments, if only one of the intake valve drive device 64 and the exhaust valve drive device 68 is included, the exhaust valve 66 or the intake valve 62 is controlled at the opening/closing timing obtained in advance for accordingly suppressing the self-EGR amount in the most effective manner (e.g., as close as possible to zero). At least one of the intake valve drive device 64 and the exhaust valve drive device 68 may not necessarily be included and, in this case, the engine rotation fluctuations are suppressed by the engine rotation fluctuation suppression control other than the self-EGR amount suppression control (the EGR amount suppression control, the lean-burn control, and the ignition delay control). The same concept is applicable to the EGR device 76.

The described embodiments are merely exemplary embodiments and the present invention may be implemented in variously modified and improved forms based on the knowledge of those skilled in the art.

EXPLANATIONS OF LETTERS OR NUMERALS

10: hybrid vehicle
12: engine
14: output gear (output rotating member)
16: power distribution mechanism (differential mechanism)
18: gear mechanism (gear)
20: transmission portion (electric differential portion)
100: electronic control device (control device)
MG1: first electric motor (differential electric motor)
MG2: second electric motor (electric motor for running)

The invention claimed is:

1. A control device of a hybrid vehicle including an electric differential portion having a differential mechanism distributing power from an engine to a differential electric motor and an output rotating member and an electric motor for running coupled to the output rotating, member in power transmittable manner such that a differential state of the differential mechanism is controlled by controlling an operating state of the differential electric motor comprising:
a rattling noise occurrence region determining portion for determining whether an output torque of the electric motor for running is within a predetermined range or not, and
an engine rotation fluctuation suppression control portion for suppressing rotation fluctuations of the engine as compared to the case that the output torque of the electric motor for running out of the predetermined range if the output torque of the electric motor for running is determined to be within a predetermined range by the rattling noise occurrence region determining portion and the engine rotation fluctuation suppression control portion suppressing rotation fluctuations of the engine by at least one of a control for suppressing an exhaust gas recirculation amount, a control for suppressing a remaining amount of combustion as in a cylinder in an exhaust stroke, a control shifting an air-fuel ratio to a lean side, and a control for delaying an ignition timing.

2. The control device of a hybrid vehicle of claim 1, wherein the predetermined range is a gear bearing noise occurrence region obtained in advance as a range of the output torque of the electric motor for running in which a gear bearing noise easily occurs due to the rotation fluctuations of the engine in gears making up the electric differential portion.

3. The control device of a hybrid vehicle of claim 1, further comprising:

an engine operating point shift control portion for shifting an operating point of the engine operated along a predetermined engine optimum fuel consumption line when the output torque of the electric motor for running is out of the predetermined range, onto a gear bearing noise avoidance operation line obtained in advance for avoiding the gear bearing noise due to the rotation fluctuations of the engine in the gears making up the electric differential portion if the output torque of the electric motor for running is determined to be within the predetermined range by the rattling noise occurrence region determining portion, and a control effect determining portion for selecting one of the control for suppressing the rotation fluctuations of the engine by the engine rotation fluctuation suppression control portion and the control for shifting the operating point of the engine onto the gear bearing noise avoidance operation line by the engine operating point shift control portion and providing such that fuel consumption deterioration is more suppressed at the time of provision of control if the output torque of the electric motor for running is determined to be within the predetermined range by the rattling noise occurrence region determining portion.

4. The control device of a hybrid vehicle of claim 2, further comprising:

an engine operating point shift control portion for shifting an operating point of the engine operated along a predetermined engine optimum fuel consumption line when the output torque of the electric motor for running is out of the predetermined range onto a gear bearing noise avoidance operation line obtained in advance for avoiding the gear bearing noise due to the rotation, fluctuations of the engine in the gears making up the electric differential portion if the output torque of the electric motor for running is determined to be within the predetermined range by the rattling noise occurrence region determining portion, and a control effect determining portion for selecting one of the control for suppressing the rotation fluctuations of the engine by the engine rotation fluctuation suppression control portion and the control for shifting the operating point of the engine onto the gear bearing noise avoidance operation line by the engine operating point shift control portion and providing such that fuel consumption deterioration is more suppressed at the time of provision of control if the output torque of the electric motor for running is determined to be within the predetermined range by the rattling noise occurrence region determining portion.

5. The control device of a hybrid vehicle of claim 1, further comprising:

an engine operating point shift control portion for shifting an operating point of the engine operated along a predetermined engine optimum fuel consumption line when the output torque of the electric motor for running is out of the predetermined range onto a gear bearing noise avoidance operation line obtained in advance for avoiding the gear noise due to the rotation fluctuations of the engine in the gears making up the electric differential portion if the output torque of the electric motor for running is determined to be within the predetermined range by the rattling noise occurrence region determining portion, and wherein the control for suppressing the rotation fluctuations of the engine by the engine rotation fluctuation suppression control portion and the control for shifting the operating point of the engine onto the gear bearing noise avoidance operation line by the engine operating point shift control portion are provided in a combined manner if the output torque of the electric motor for running is determined to be within the predetermined range by the rattling noise occurrence region determining portion.

6. The control device of a vehicle of claim 2, further comprising:

an engine operating point shift control portion for shifting an operating point of the engine operated along a predetermined engine and mini fuel consumption line when the output torque of the electric motor for running is out of the predetermined range onto a gear bearing noise avoidance operation line obtained in advance for avoiding the gear bearing noise due to the rotation fluctuations of the engine in the gears making up the electric differential portion if the output torque of the electric motor for running is determined to be within the predetermined range by the rattling noise occurrence region determining portion, and wherein the control for suppressing the rotation fluctuations of the engine by the engine rotation fluctuation suppression control portion and the control for shifting the operating point of the engine onto the gear bearing noise avoidance operation line by the engine operating point shift control portion are provided in a combined manner if the output torque of the electric motor for running is determined to be within the predetermined range by the rattling noise occurrence region determining portion.

\* \* \* \* \*

UNITED STATES PATENT AND TRADEMARK OFFICE
CERTIFICATE OF CORRECTION

| | | |
|---|---|---|
| PATENT NO. | : 8,712,652 B2 | Page 1 of 1 |
| APPLICATION NO. | : 13/990351 | |
| DATED | : April 29, 2014 | |
| INVENTOR(S) | : Taku Harada et al. | |

It is certified that error appears in the above-identified patent and that said Letters Patent is hereby corrected as shown below:

On the Title Page

The references cited in item (56) should be amended to add the following reference:

<u>5,967,640 A</u>    10/1999    Yamaguchi

Signed and Sealed this
Twenty-sixth Day of August, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,712,652 B2 | Page 1 of 1 |
| APPLICATION NO. | : 13/990351 | |
| DATED | : April 29, 2014 | |
| INVENTOR(S) | : Taku Harada et al. | |

It is certified that error appears in the above-identified patent and that said Letters Patent is hereby corrected as shown below:

On the title page item (56) should be amended to read the following:

<u>5,967,940</u>   10/1999   Yamaguchi

Signed and Sealed this
Twenty-fourth Day of February, 2015

Michelle K. Lee
*Deputy Director of the United States Patent and Trademark Office*